United States Patent
Athavale et al.

(10) Patent No.: US 11,822,684 B1
(45) Date of Patent: Nov. 21, 2023

(54) SYSTEMS AND METHODS FOR IDENTIFYING POSSIBLE LEAKAGE PATHS OF SENSITIVE INFORMATION

(71) Applicant: Veritas Technologies LLC, Santa Clara, CA (US)

(72) Inventors: Anand Athavale, San Jose, CA (US); Shailesh A. Dargude, San Jose, CA (US); Satish Grandhi, Santa Clara, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 186 days.

(21) Appl. No.: 16/740,997

(22) Filed: Jan. 13, 2020

Related U.S. Application Data (63) Continuation-in-part of application No. PCT/US2019/025801, filed on Apr. 4, 2019.
(Continued)

(51) Int. Cl.
G06F 21/62 (2013.01)
G06F 21/64 (2013.01)
(Continued)

(52) U.S. Cl.
CPC .......... G06F 21/6218 (2013.01); G06F 21/64 (2013.01); *G06F 21/31* (2013.01);
(Continued)

(58) Field of Classification Search
CPC .. G06F 21/6218; G06F 21/6245; G06F 21/64; G06F 21/31; G06F 21/34;
(Continued)

(56) References Cited

U.S. PATENT DOCUMENTS

| | | | | |
|---|---|---|---|---|
| 5,561,706 A | * | 10/1996 | Fenner | H04W 4/24 |
| | | | | 455/406 |
| 6,836,465 B2 | * | 12/2004 | Rajan | H04L 45/04 |
| | | | | 375/E7.184 |

(Continued)

FOREIGN PATENT DOCUMENTS

| | | | | |
|---|---|---|---|---|
| CN | 108664803 A | * | 10/2018 | ........... G06F 21/602 |
| CN | 109977690 A | * | 7/2019 | ......... G06F 21/6218 |

(Continued)

OTHER PUBLICATIONS

LeakProber: A Framework for Profiling Sensitive Data Leakage Paths by Junfeng Yu, Shengzhi Zhang, Peng Liu and Zhitang Li pp. 10; Feb. 21-23 (Year: 2011).*

(Continued)

*Primary Examiner* — Shahriar Zarrineh
*Assistant Examiner* — Ali H. Cheema
(74) *Attorney, Agent, or Firm* — Greenberg Traurig, LLP (57) ABSTRACT

A computer-implemented method for identifying possible leakage paths of sensitive information may include (i) discovering an original set of users having permission to read the sensitive information at an originating storage device in an originating location via an original set of information transfer paths and (ii) performing a security action. The security action may include (A) determining an additional set of information transfer paths having information transfer paths other than the information transfer paths already discovered, via which the original set of users can write the sensitive information and (B) identifying an additional set of users having permission to read the sensitive information via the additional set of information transfer paths.

20 Claims, 4 Drawing Sheets

Related U.S. Application Data (60) Provisional application No. 62/653,541, filed on Apr. 5, 2018.

(51) Int. Cl.
*H04L 9/40* (2022.01)
*G06F 21/31* (2013.01)
*G06F 21/34* (2013.01)

(52) U.S. Cl.
CPC ............ *G06F 21/34* (2013.01); *H04L 63/083* (2013.01); *H04L 63/0876* (2013.01); *H04L 63/10* (2013.01); *H04L 63/1408* (2013.01)

(58) Field of Classification Search
CPC ............ H04L 63/0407; H04L 63/0428; H04L 29/06823; H04L 29/06829; H04L 63/083; H04L 63/0876; H04L 63/105; H04L 63/14; H04L 63/10
USPC .................................................. 726/1, 4, 28
See application file for complete search history.

(56) References Cited

U.S. PATENT DOCUMENTS

| | | | | |
|---|---|---|---|---|
| 6,888,842 | B1* | 5/2005 | Kirkby | H04L 41/0896 |
| | | | | 370/429 |
| 8,271,642 | B1* | 9/2012 | Sankararaman | H04L 63/102 |
| | | | | 713/153 |
| 8,671,455 | B1* | 3/2014 | Zhu | G06F 21/554 |
| | | | | 726/26 |
| 8,813,236 | B1* | 8/2014 | Saha | H04L 63/1408 |
| | | | | 726/25 |
| 8,914,410 | B2* | 12/2014 | Hannel | H04L 63/105 |
| | | | | 707/E17.014 |
| 9,100,430 | B1* | 8/2015 | Seiver | H04L 63/101 |
| 9,654,458 | B1* | 5/2017 | Bhaktwatsalam | H04L 63/0876 |
| 9,819,685 | B1* | 11/2017 | Scott | H04L 63/104 |
| 9,876,801 | B1* | 1/2018 | Scott | H04L 63/104 |
| 10,237,073 | B2* | 3/2019 | Benson | H04L 9/3247 |
| 2002/0138632 | A1* | 9/2002 | Bade | H04L 67/42 |
| | | | | 709/229 |
| 2005/0288036 | A1* | 12/2005 | Brewer | H04W 8/18 |
| | | | | 455/456.2 |
| 2012/0192252 | A1* | 7/2012 | Kuo | H04L 65/1069 |
| | | | | 726/4 |
| 2013/0031598 | A1* | 1/2013 | Whelan | H04W 12/08 |
| | | | | 726/28 |
| 2013/0227645 | A1* | 8/2013 | Lim | H04W 12/122 |
| | | | | 726/3 |
| 2015/0304984 | A1* | 10/2015 | Khemani | H04W 16/18 |
| | | | | 455/456.1 |
| 2016/0006744 | A1* | 1/2016 | Du | H04L 51/04 |
| | | | | 726/4 |
| 2016/0036816 | A1* | 2/2016 | Srinivasan | H04L 63/1425 |
| | | | | 726/1 |
| 2016/0050224 | A1* | 2/2016 | Ricafort | H04L 63/1416 |
| | | | | 726/23 |
| 2016/0134624 | A1* | 5/2016 | Jacobson | H04W 12/06 |
| | | | | 726/4 |
| 2016/0344756 | A1* | 11/2016 | Ricafort | H04L 63/145 |
| 2016/0357994 | A1* | 12/2016 | Kanakarajan | H04L 41/28 |
| 2017/0086163 | A1* | 3/2017 | Khemani | H04W 40/246 |
| 2017/0221288 | A1* | 8/2017 | Johnson | G07C 9/257 |
| 2018/0159874 | A1* | 6/2018 | Ricafort | H04L 63/1425 |
| 2018/0227315 | A1* | 8/2018 | Taneja | H04L 63/1408 |
| 2018/0247503 | A1* | 8/2018 | Kariniemi | G08B 13/183 |
| 2018/0255419 | A1* | 9/2018 | Canavor | H04L 63/107 |
| 2018/0343188 | A1* | 11/2018 | Betge-Brezetz | H04L 45/04 |
| 2018/0365676 | A1* | 12/2018 | Studnicka | H04W 4/021 |
| 2019/0114930 | A1* | 4/2019 | Russell | G08G 5/0073 |
| 2019/0116192 | A1* | 4/2019 | Singh | H04L 63/1441 |
| 2019/0207980 | A1* | 7/2019 | Sarin | G06F 21/85 |
| 2019/0258799 | A1* | 8/2019 | Harris | H04L 63/101 |
| 2019/0279485 | A1* | 9/2019 | VanBlon | H04L 63/107 |

FOREIGN PATENT DOCUMENTS

| | | | | | |
|---|---|---|---|---|---|
| JP | 2003099400 | A | * | 4/2003 | ......... G06F 21/6218 |
| JP | 2005267353 | A | * | 9/2005 | ............ G06F 12/14 |
| JP | 2008305253 | A | * | 12/2008 | ............ G06F 21/20 |
| JP | 4450653 | B2 | * | 4/2010 | ............ G06F 21/24 |
| JP | 2016538618 | A | * | 12/2016 | ........... G06F 21/577 |

OTHER PUBLICATIONS

FlowMon: Detecting Malicious Switches in Software-Defined Networks By Andrzej Kamisiński and Carol Fung pp. 7; Oct. 12 (Year: 2015).*

A Review on Data Leakage Detection for Secure Communication By Kishu Gupta and Ashwani Kush pp. 7; October (Year: 2017).*

RWFS: Design and Implementation of File System Executing Access Control Based on User's Location BY Yuki Yagi, Naofumi Kitsunezaki, Hiroki Saito and Yoshito Tobe pp. 6; IEEE (Year: 2014).*

PiOS: Detecting Privacy Leaks in iOS Applications by Manuel Egele, Christopher Kruegely, Engin Kirdaz, and Giovanni Vignay pp. 15; Published (Year: 2011).*

\* cited by examiner

FIG. 4

SYSTEMS AND METHODS FOR IDENTIFYING POSSIBLE LEAKAGE PATHS OF SENSITIVE INFORMATION

CROSS REFERENCE TO RELATED APPLICATION

This application is a continuation-in-part of PCT Application No. PCT/US2019/025801 filed Apr. 4, 2019, which claims the benefit of U.S. Provisional Application No. 62/653,541, filed Apr. 5, 2018, the disclosures of each of which are incorporated, in their entireties, by this reference.

BACKGROUND

In an ever-shrinking world of digital data, organizations have data centers and users spread across the globe. With data privacy regulations like Global Data Protection Regulation (GDPR), organizations may face risk of non-compliance by accidentally providing otherwise legitimate ways for personal data to reach geographic locations that are prohibited by the regulation. There are no easy ways to detect and prevent accidental non-compliance occurrences other than merely announcing do's and don'ts to stakeholders and hoping the stakeholders comply, and/or, finding out about non-compliance occurrences only after the fact. The problem is multiplied when multiple content sources are scattered across the globe in various locations, which leads to sensitive data both having simple and direct ways of ending up in prohibited locations, as well as possibly travelling from one location to another to traverse prohibited locations and/or be transferred to prohibited locations.

SUMMARY

As will be described in greater detail below, the present disclosure describes various systems and methods for identifying possible leakage paths of sensitive information.

In one embodiment, a method for identifying possible leakage paths of sensitive information may include (i) discovering, at a computing device comprising at least one processor, an original set of users having permission to read the sensitive information at an originating storage device in an originating location via an original set of information transfer paths and (ii) performing a security action. The security action may include (A) determining an additional set of information transfer paths having information transfer paths other than the information transfer paths already discovered, via which the original set of users can write the sensitive information and (B) identifying an additional set of users having permission to read the sensitive information via the additional set of information transfer paths.

In an example, the security action may further include (i) ascertaining another additional set of information transfer paths having information transfer paths other than the information transfer paths already determined, via which at least one of (A) the original set of users can write the sensitive information and/or (B) other identified additional users can write the sensitive information, (ii) finding another additional set of users having permission to read the sensitive information via the another additional set of information transfer paths, and (iii) repeating the ascertaining and finding steps until no additional information transfer paths are identified.

In some examples, the security action may further include (i) comparing geographic locations of information transfer paths in at least one additional set of information transfer paths to a list of prohibited geographic locations and (ii) flagging a specific information transfer path in the at least one additional set of information transfer paths when the specific information transfer path connects to a prohibited geographic location. In an embodiment, the security action may further include preventing transfer of a specific file including the sensitive information via the flagged specific information transfer path. In some embodiments, the security action may further include preventing transfer of the sensitive information via the flagged specific information transfer path.

In an example, the security action may further include (i) comparing geographic locations of users in at least one additional set of additional set of users to a list of prohibited geographic locations and (ii) flagging a specific user in the at least one additional set of users when the specific user is in a prohibited location. In some examples, the security action may further include preventing access to a specific file including the sensitive information by the flagged specific user. In an embodiment, the security action may further include preventing access to the sensitive information by the flagged specific user. In some embodiments, the security action may further include changing an information access permission of the flagged specific user.

In one example, a system for identifying possible leakage paths of sensitive information may include several modules stored in a memory, including (i) a discovering module, stored in the memory, that discovers an original set of users having permission to read the sensitive information at an originating storage device in an originating location via an original set of information transfer paths and (ii) a performing module, stored in the memory, that performs a security action. In an example, the security action may include (i) determining an additional set of information transfer paths having information transfer paths other than the information transfer paths already discovered, via which the original set of users can write the sensitive information and (ii) identifying an additional set of users having permission to read the sensitive information via the additional set of information transfer paths. In an example, the system may also include at least one physical processor that executes the discovering module and the performing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) discover, at the computing device, an original set of users having permission to read the sensitive information at an originating storage device in an originating location via an original set of information transfer paths and (ii) perform a security action. In some examples, the security action may include (i) determining an additional set of information transfer paths having information transfer paths other than the information transfer paths already discovered, via which the original set of users can write the sensitive information and (ii) identifying an additional set of users having permission to read the sensitive information via the additional set of information transfer paths.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for identifying possible leakage paths of sensitive information.

In some examples, provided systems and methods may determine, based at least in part on permissions of origin of sensitive data, when there is potential for sensitive data to be transferred to prohibited countries. In some examples, provided systems and methods may determine when there are information transfer paths via which sensitive data may reach prohibited locations due to inappropriately assigned user permissions across information transfer paths, such as read permissions, write permissions, and/or access permissions.

In some embodiments, provided systems and methods may analyze information describing who can access specific sensitive data, information describing what data is sensitive, information describing geographic locations of computing devices (e.g., servers), and information describing prohibited locations (e.g., from Global Data Protection Regulatory Authorities), to map possible paths by which the sensitive data may reach the prohibited locations (e.g., while using a customer's legitimate infrastructure). In some examples, provided systems and methods may automatically mitigate non-compliance risk. In some examples, provided systems and methods may automatically reduce leakage of sensitive data to unauthorized devices in prohibited geographic locations and/or by unauthorized devices in prohibited geographic locations. In some examples, provided systems and methods may alert users about non-compliance risk. In some examples, alerting the users may save the users from huge fines and aid the users in proving the users are taking every measure technologically available to remain compliant with data privacy regulations.

By doing so, the systems and methods described herein may improve the overall functionality of computing devices by automatically performing preemptive security actions to identify, prevent, and/or mitigate data leakage, thus enabling a higher level of protection for sensitive information. For example, the provided techniques may advantageously improve the functionality of computing devices by improving data protection services and/or software. Also, in some examples, the systems and methods described herein may advantageously improve the functionality of computing devices by automatically saving power, saving time, better managing information storage devices, and/or better managing network bandwidth utilization.

Figure 1:
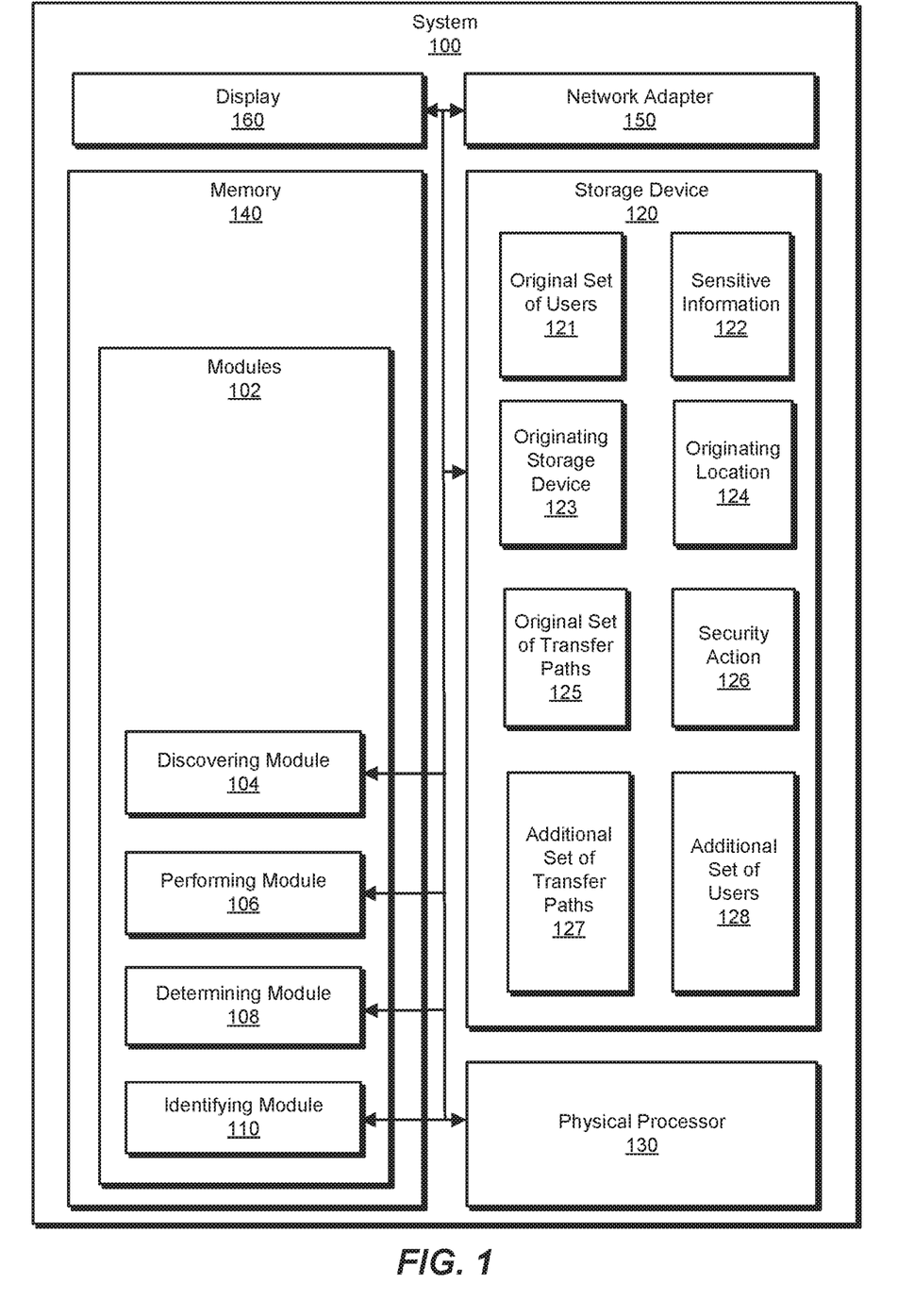
FIG. 1 is a block diagram of an example system for identifying possible leakage paths of sensitive information.
Figure 2:
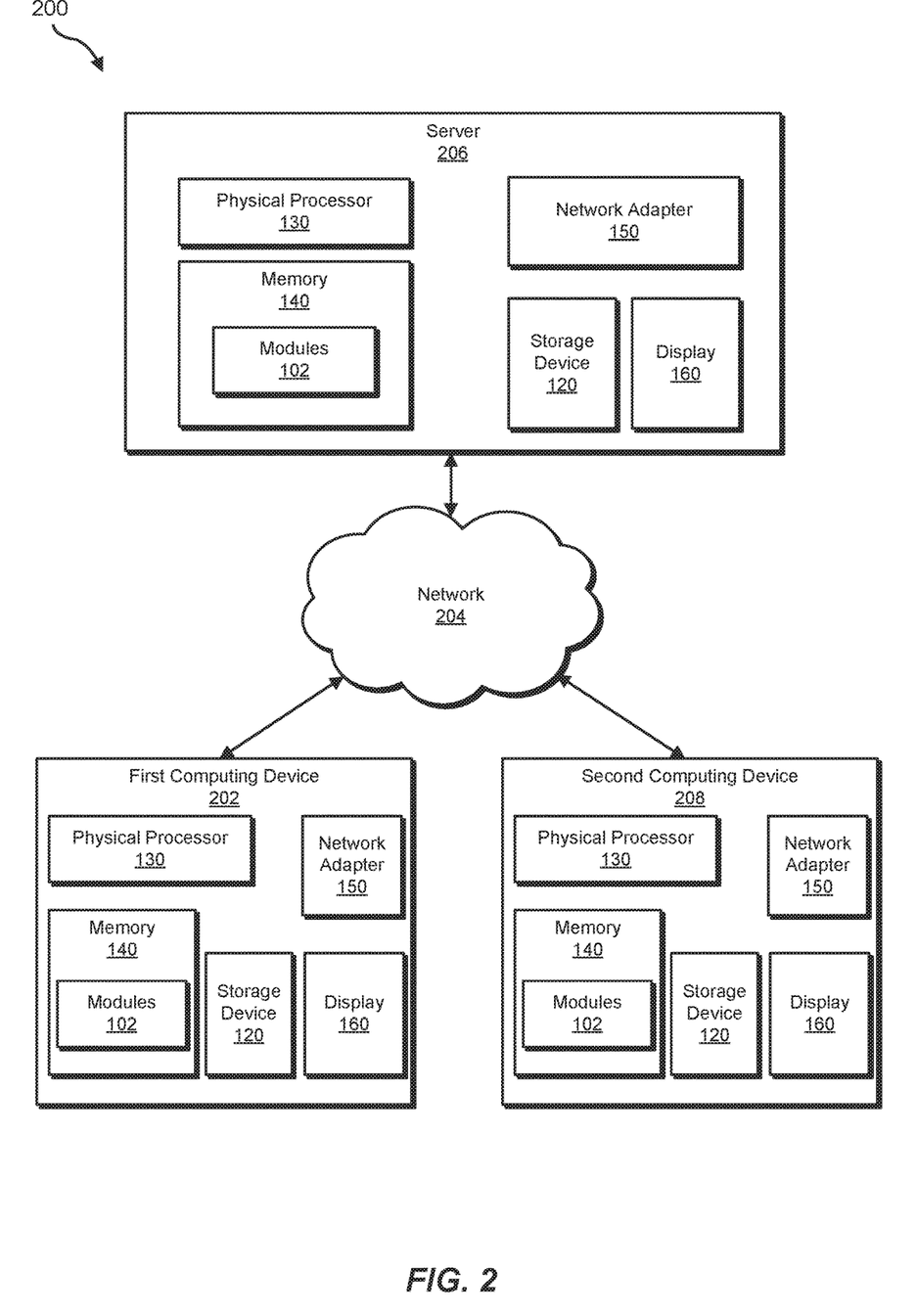
FIG. 2 is a block diagram of an additional example system for identifying possible leakage paths of sensitive information.
Figure 3:
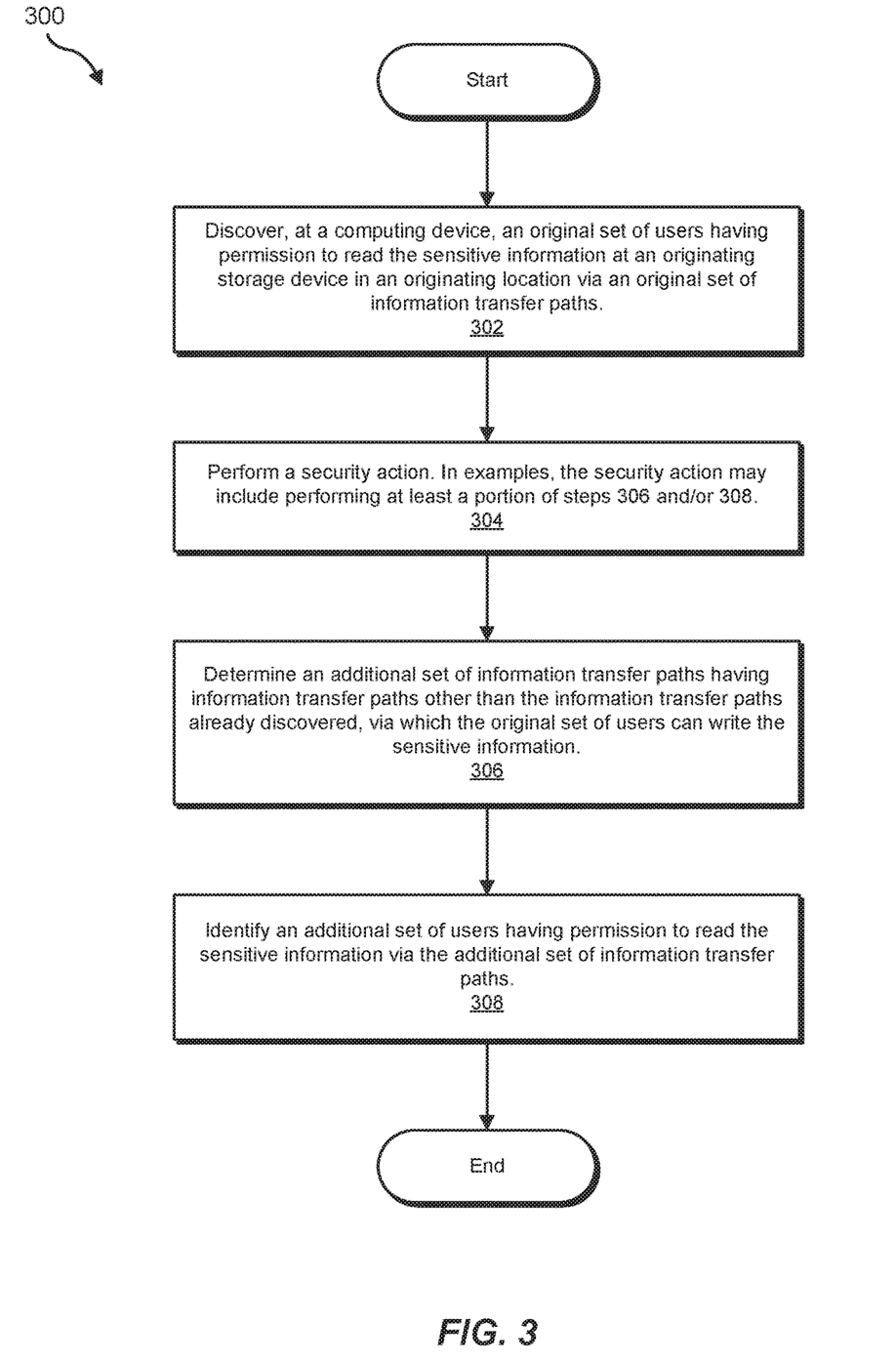
FIG. 3 is a flow diagram of an example method for identifying possible leakage paths of sensitive information.
Figure 4:
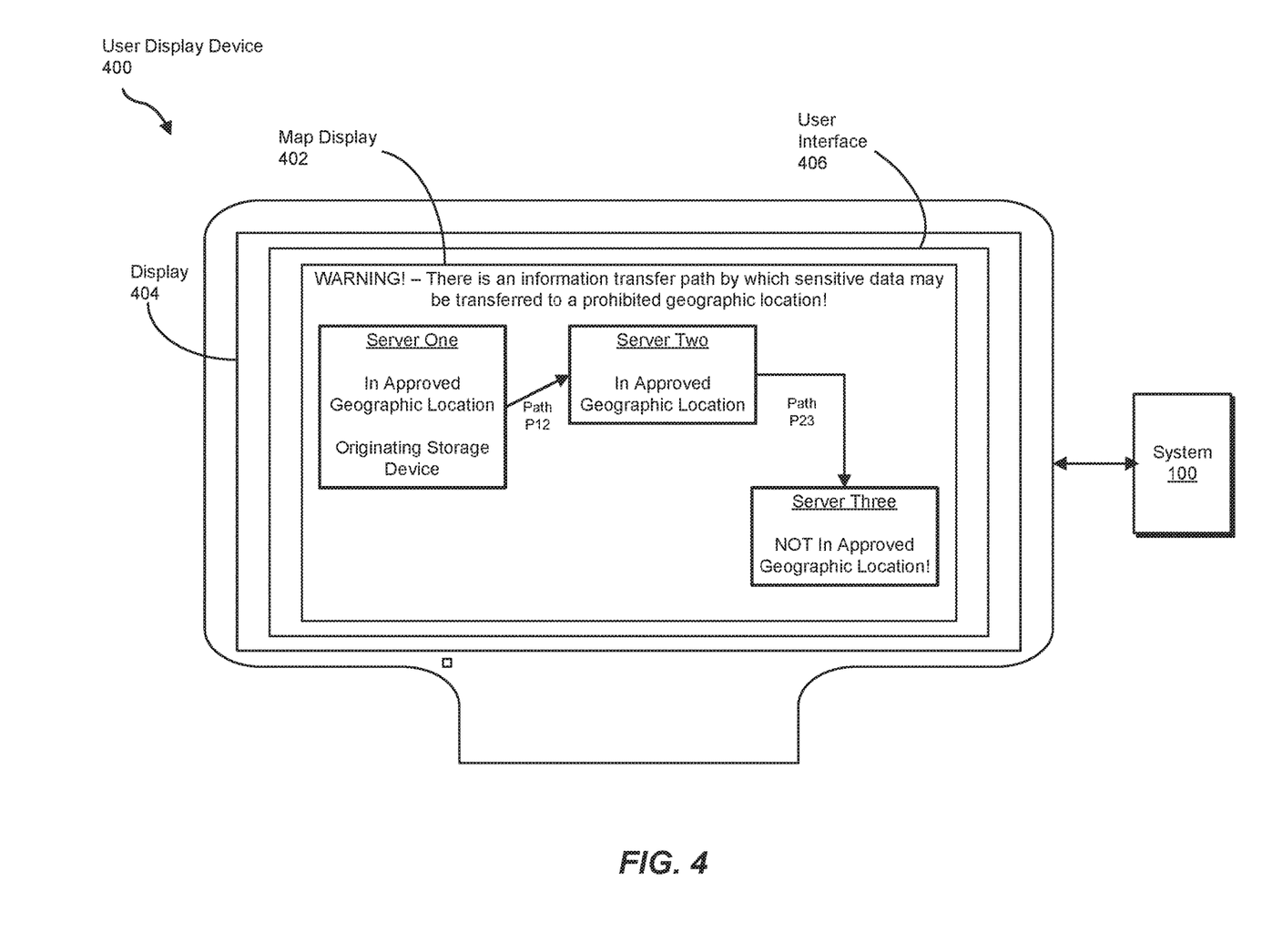
FIG. 4 is a block diagram of an example data leakage paths display and warning message on a user display device.

The following provides, with reference to FIGS. 1-2 and 4, detailed descriptions of example systems for identifying possible leakage paths of sensitive information. Detailed descriptions of corresponding computer-implemented methods are provided in connection with FIG. 3.

FIG. 1 is a block diagram of an example system 100 for identifying possible leakage paths of sensitive information. As illustrated in this figure, example system 100 may include one or more modules 102 for performing one or more tasks. As will be explained in greater detail below, modules 102 may include a discovering module 104, a performing module 106, a determining module 108, and/or an identifying module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., first computing device 202, server 206, and/or second computing device 208). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of an original set of users 121, sensitive information 122, an originating storage device 123, an originating location 124, an original set of transfer paths 125, a security action 126, an additional set of transfer paths 127, and/or an additional set of users 128. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate identifying possible leakage paths of sensitive information. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more network adapters, such as network adapter 150. In some examples, network adapter 150 may be a physical network adapter connected to a physical network (e.g., network 204 in FIG. 2). IN some examples, a network adapter may also be referred to as a network interface card (NIC).

As illustrated in FIG. 1, example system 100 may also include one or more display devices, such as display 160. Display 160 generally represents any type or form of device capable of visually displaying information (e.g., to a user). In some examples, display 160 may present a graphical user interface. In non-limiting examples, display 160 may present at least a portion of information indicating one or more of original set of users 121, sensitive information 122, originating storage device 123, originating location 124, original set of transfer paths 125, security action 126, additional set of transfer paths 127, and/or additional set of users 128.

Example system 100 in FIG. 1 may be implemented in a variety of ways. For example, all or a portion of example system 100 may represent portions of example system 200 in FIG. 2. As shown in FIG. 2, system 200 may include a first computing device 202 in communication with a server 206 via a network 204, as well as a second computing device 208 in communication with server 206 via network 204. In one example, all or a portion of the functionality of modules 102 may be performed by first computing device 202, server 206, second computing device 208, and/or any other suitable computing system. As is described in greater detail herein, one or more of modules 102 from FIG. 1 may, when executed by at least one processor of first computing device 202, server 206, and/or second computing device 208, enable first computing device 202, server 206, and/or second computing device 208 to identify possible paths by which computer networks may leak sensitive information.

First computing device 202 generally represents any type or form of computing device capable of reading computer-executable instructions. In some examples, first computing device 202 may represent a computer running security software, such as data leakage prevention software. In some examples, security software may include a processor-readable medium storing computer-readable instructions that when executed cause a processor in a computing device to perform a security action. Additional examples of first computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device. In some examples, first computing device 202 may be located in an approved geographic location per data privacy regulations.

Network 204 generally represents any medium or architecture capable of facilitating communication or data transfer. In one example, network 204 may facilitate communication between first computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network. In some examples, network 204 may provide at least one information transfer path.

Server 206 generally represents any type or form of computing device capable of reading computer-executable instructions. In some examples, server 206 may represent a computer running security software, such as data leakage prevention software. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Second computing device 208 generally represents any type or form of computing device capable of reading computer-executable instructions. In some examples, second computing device 208 may represent a computer running security software, such as data leakage prevention software. Additional examples of second computing device 208 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device. In some examples, second computing device 208 may be located in a prohibited geographic location per data privacy regulations.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for identifying possible leakage paths of sensitive information. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple substeps, examples of which will be provided in greater detail below.

As illustrated in FIG. 3, at step 302 one or more of the systems described herein may discover (e.g., at computing devices) original sets of users having permissions to read the sensitive information at originating storage devices in originating locations via original sets of information transfer paths. The systems described herein may perform step 302 in a variety of ways. For example, discovering module 104 may, as part of first computing device 202, server 206, and/or second computing device 208 in FIG. 2, discover, at system 100, original set of users 121 having permission to read sensitive information 122 at originating storage device 123 in an originating location 124 via original set of information transfer paths 125.

The term "sensitive data," as used herein, generally refers to valuable information, the uncontrolled dissemination of which may cause harm and/or losses to people, governments, and/or businesses. Examples of sensitive information include, without limitation, personally identifiable information (PII). In some embodiments, sensitive information may include identification (ID) numbers, social security numbers, account numbers in conjunction with names, emails, addresses, phone numbers, financial information, health care information, business strategies, classified government information, law enforcement information, the like, or combinations thereof. In some examples, the terms "sensitive data" and "sensitive information" may be interchangeable.

The term "information transfer path," as used herein, generally refers to a physical connection between computing devices by which digital electronic information may be transferred. Examples of information transfer path may include, without limitation, physical electrical devices such as routers, network interface cards, fiber optic cables, ethernet cables, multiplexers, and/or other devices configured to transfer digital electronic information.

As illustrated in FIG. 3, at step 304 one or more of the systems described herein may perform security actions. In examples, the security actions may include performing at least a portion of steps 306 and/or 308. The systems described herein may perform step 304 in a variety of ways. For example, performing module 106 may, as part of first computing device 202, server 206, and/or second computing device 208 in FIG. 2, perform security action 126.

In some examples, security action 126 may include blocking access to devices (e.g., storage devices, memories, network devices, servers, network interface devices, information transfer paths, etc.), allowing limited access to devices, allowing read-only access to devices, encrypting information, and/or other acts limiting access to devices. In some examples security action 126 may be performed automatically. In some embodiments, security action 126 may attempt to identify and/or ameliorate potential security risks. In some examples, security action 126 may include blocking access to and/or by executing processes. In additional examples, security action 126 may include displaying, on user displays, warnings indicating that processes may be potentially dangerous.

In some examples, security actions may include displaying, on user displays (e.g., devices of first computing device 202, server 206, and/or second computing device 208 in FIG. 2), messages indicating imposing of security actions. In additional examples, the security actions may include displaying, on user displays, warnings indicating that user approval may be required to transfer sensitive information via specific information transfer paths.

In an embodiment, security actions may include sending, to first computing device 202, server 206, and/or second computing device 208 in FIG. 2, messages indicating imposing of security actions.

In some examples, security actions may include prophylactic measures taken to safeguard electronic information. Prophylactic measures may include acts undertaken to prevent, detect, and/or mitigate vulnerabilities of electronic information, to implement data loss prevention policies (e.g., preventing and/or mitigating privacy leakage), and/or to thwart malicious activities targeting electronic information on electronic computing devices.

As illustrated in FIG. 3, at step 306 one or more of the systems described herein may determine additional sets of information transfer paths having information transfer paths other than the information transfer paths already discovered, via which the original sets of users can write the sensitive information. The systems described herein may perform step 306 in a variety of ways. For example, determining module 110 may, as part of first computing device 202, server 206, and/or second computing device 208 in FIG. 2, determine additional set of information transfer paths 127 having information transfer paths other than the information transfer paths already discovered, via which original set of users 121 can write sensitive information 122.

As illustrated in FIG. 3, at step 308 one or more of the systems described herein may identify additional sets of users having permissions to read the sensitive information via the additional sets of information transfer paths. The systems described herein may perform step 308 in a variety of ways. For example, identifying module 110 may, as part of first computing device 202, server 206, and/or second computing device 208 in FIG. 2, identify additional set of users 128 having permission to read sensitive information 122 via additional set of information transfer paths 127.

In some examples, security actions (e.g., security action 126) may further include (i) ascertaining more additional sets of information transfer paths having information transfer paths other than the information transfer paths already determined, via which at least one of (A) original sets of users can write the sensitive information and/or (B) other identified additional users can write the sensitive information, (ii) finding more additional sets of users having permission to read the sensitive information via the more additional sets of information transfer paths, and (iii) repeating the ascertaining and finding steps until no further additional information transfer paths are identified.

In some embodiments, security actions (e.g., security action 126) may further include (i) comparing geographic locations of information transfer paths in at least one additional set of information transfer paths to lists of prohibited geographic locations and (ii) flagging specific information transfer paths in the at least one additional set of information transfer paths when the specific information transfer paths connect to prohibited geographic locations.

In some embodiments, security actions may further include preventing transfer of the sensitive information via at least one of the flagged specific information transfer paths. In an embodiment, security actions may further include preventing transfer of specific files (e.g., that include the sensitive information) via the flagged specific information transfer paths.

In some examples, security actions (e.g., security action 126) may further include (i) comparing geographic locations of users in at least one additional set of additional set of users to lists of prohibited geographic locations and (ii) flagging specific users in the at least one additional set of users when the specific users are in prohibited locations.

In an embodiment, security actions may further include preventing access to the sensitive information by the flagged specific users. In some embodiments, security actions may further include preventing access to specific files by the flagged specific users (e.g., such as those specific files including the sensitive information). In some embodiments, security actions may further include changing information access permissions of the flagged specific users.

As detailed above, the steps outlined in computer-implemented method 300 in FIG. 3 may provide methods for identifying possible leakage paths of sensitive information and, in some examples, automatically performing an action in response to the same. In some examples, the provided systems and methods may improve the overall functionality of computing devices by automatically performing preemptive security actions to identify, prevent, and/or mitigate data leakage, thus enabling a higher level of protection for sensitive information.

Provided below is an example non-limiting example implementation of computer-implemented method 300 for identifying possible leakage paths of sensitive information. The steps may be performed by any suitable computer-executable code and/or computing system, including system 100 in FIG. 1, system 200 in FIG. 2, and/or variations or combinations of one or more of the same. In one example, each of the steps may represent an algorithm whose structure includes and/or is represented by multiple sub-steps, examples of which will be provided in greater detail below.

In some examples, the following information may be input to this method: an originating geographic location of sensitive data to which sensitive data is to be confined, classification rules for identifying sensitive data for use by a classification engine to identify sensitive data, a user geographic location for users, and/or information describing other content sources (e.g., computing devices) in a data estate.

Step 1 may include Identifying users who have permission at the originating location and identifying users who have permissions for other content sources. In examples, stored information may be identified as sensitive data.

Step 2 may include designating path(s) at originating locations as a set DataSet1 (DataSet1 includes paths P11, P12 . . . Pn1), where sensitive data is located and each site is respectively numbered (e.g., "1", "2", etc.). Then, determine a set of users UserSet1 (U11, U12 . . . Um1) which has read permission to data set DataSet1. For example, UserSet1=Find(User Set having Read permission) where dataset=DataSet1.

Step 3 may include determining which paths other than in DataSet1 to which this user set UserSet1 has write permissions. For example, DataSet2(paths P21, P22 . . . Pn2)=Find (paths where UserSet1 has write permission DataSet1(P11, P12 . . . Pn1)

Step 4 may include determining a set of users UserSet2 (U21, U22 . . . U) which has read permission to DataSet1. For example, UserSet2=Find(User Set having Read permission) where dataset=DataSet2.

Step 5 may include repeating Step 2 to Step 4 until DataSetN=DataSet(N−1). The relevant user set will be UserSetN.

Step 6 may include comparing the locations of paths in DataSetN to a prohibited locations list and when locations of paths in DataSetN are found in prohibited locations list, flagging those paths. In some examples, the method may include comparing geographical locations of users in UserSetN to the prohibited locations list and when geographical locations of users in UserSetN are found in prohibited locations list, flagging those users. Flagged users and/or flagged paths may provide a basis for revoking and/or changing access permissions of users and/or paths to prevent accidental transfer of sensitive data to prohibited locations.

FIG. 4 is a block diagram of a non-limiting example data leakage path display and warning message on a user display device. FIG. 4 depicts an depicts an example of a user display device 400 including display 404 (e.g., display 160) which may present user interface 406. In this non-limiting example, user display device 400 may display a map 402 identifying at least one information transfer path by which sensitive data may be transferred to a prohibited geographic location (e.g., path P23). In some embodiments, map display 402 may include at least one warning message as at least a part of a security action in response to identifying at least one information transfer path by which sensitive data may be transferred to a prohibited geographic location.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." In some examples, the singular may portend the plural. Finally, for ease of use, the terms "including" and "having" (and their derivatives), as used in the specification and claims, are interchangeable with and have the same meaning as the word "comprising."

What is claimed is:

1. A computer-implemented method for identifying possible leakage paths of sensitive information, at least a portion of the computer-implemented method being performed by a computing device comprising at least one processor, the computer-implemented method comprising:
    identifying a set comprising final information transfer paths associated with the sensitive information by:
        performing a discovery step comprising discovering, at the computing device, original sets of users having permissions to read the sensitive information at originating storage devices in originating locations via original sets of information transfer paths;
        performing a determination step comprising determining additional sets of information transfer paths having information transfer paths other than the original sets of information transfer paths via which the original sets of users can write the sensitive information;
        performing an identification step comprising identifying additional sets of users having permissions to read the sensitive information via the additional sets of information transfer paths;
        performing an ascertaining step comprising ascertaining more additional sets of information transfer paths having information transfer paths other than the information transfer paths already determined via which at least one of the original sets of users can write the sensitive information or additional sets of users can write the sensitive information;
        performing a finding step comprising finding more additional sets of users having permission to read the sensitive information via the more additional sets of information transfer paths; and
        repeating the ascertaining step and the finding step until no further additional information transfer paths are identified;
    comparing geographic locations of information transfer paths in the set comprising the final information transfer paths associated with the sensitive information to a list of prohibited geographic locations;
    flagging a specific information transfer path in the set comprising the final information transfer paths associated with the sensitive information that connects to a prohibited geographic location on the list of prohibited geographic locations;

displaying a map of the flagged specific information transfer path including one or more approved geographic locations leading to the prohibited geographic location;

comparing geographic locations of users with read permission or write permission associated with the sensitive information along the specific information transfer path to the list of prohibited geographic locations;

flagging a specific user from the users with read permission or write permission associated with the sensitive information along the specific information transfer path when the specific user is in a prohibited geographic location on the list of prohibited geographic locations; and changing, responsive to a combination of the flagging of the specific information transfer path and the flagging of the specific user, an information access permission of the flagged specific user.

2. The computer-implemented method of claim 1, further comprising preventing transfer of the sensitive information via the flagged specific information transfer path.

3. The computer-implemented method of claim 1, further comprising changing a read permission and a write permission of the flagged specific user.

4. The computer-implemented method of claim 1, further comprising preventing access to the sensitive information by the flagged specific user.

5. The computer-implemented method of claim 1, wherein the map of the flagged specific information transfer path further includes server information associated with the one or more approved geographic locations and the prohibited geographic location.

6. The computer-implemented method of claim 5, wherein the map of the flagged specific information transfer path further includes at least one warning message associated with the prohibited geographic location.

7. A system for identifying possible leakage paths of sensitive information, the system comprising:

a discovering module, stored in a memory, that identifies a set comprising final information transfer paths associated with the sensitive information by:

discovering original sets of users having permissions to read the sensitive information at originating storage devices in originating locations via originating sets of information transfer paths;

determining additional sets of information transfer paths having information transfer paths other than the original sets of information transfer paths via which the original sets of users can write the sensitive information; and identifying additional sets of users having permissions to read the sensitive information via the additional sets of information transfer paths;

performing an ascertaining step comprising ascertaining more additional sets of information transfer paths having information transfer paths other than the information transfer paths already determined via which at least one of the original sets of users can write the sensitive information or additional sets of users can write the sensitive information;

performing a finding step comprising finding more additional sets of users having permission to read the sensitive information via the more additional sets of information transfer paths; and repeating the ascertaining step and the finding step until no further additional information transfer paths are identified;

a performing module, stored in the memory, that performs a security action in connection with the set comprising the final information transfer paths, the security action comprising:

comparing geographic locations of information transfer paths in the set comprising the final information transfer paths associated with the sensitive information to a list of prohibited geographic locations;

flagging a specific information transfer path in the set comprising the final information transfer paths associated with the sensitive information that connects to a prohibited geographic location on the list of prohibited geographic locations;

displaying a map of the flagged specific information transfer path including one or more approved geographic locations leading to the prohibited geographic location;

comparing geographic locations of users with read permission or write permission associated with the sensitive information along the specific information transfer path to the list of prohibited geographic locations;

flagging a specific user from the users with read permission or write permission associated with the sensitive information along the specific information transfer path when the specific user is in a prohibited geographic location on the list of prohibited geographic locations; and changing, responsive to a combination of the flagging of the specific information transfer path and the flagging of the specific user, an information access permission of the flagged specific user; and at least one physical processor that executes the discovering module and the performing module.

8. The system of claim 7, wherein the security action further comprises preventing transfer of the sensitive information via the flagged specific information transfer path.

9. The system of claim 7, wherein the security action further comprises preventing access to the sensitive information by the flagged specific user.

10. The system of claim 7, further comprising changing a read permission and a write permission of the flagged specific user.

11. The system of claim 7, wherein the map of the flagged specific information transfer path further includes server information associated with the one or more approved geographic locations and the prohibited geographic location.

12. The system of claim 11, wherein the map of the flagged specific information transfer path further includes at least one warning message associated with the prohibited geographic location.

13. A non-transitory computer-readable medium comprising one or more computer-executable instructions that, when executed by at least one processor of a computing device, cause the computing device to:

identify a set comprising final information transfer paths associated with sensitive information by:

performing a discovery step comprising discovering, at the computing device, original sets of users having permissions to read the sensitive information at originating storage devices in originating locations via original sets of information transfer paths;

performing a determination step comprising determining additional sets of information transfer paths having information transfer paths other than the original sets of information transfer paths via which the original sets of users can write the sensitive information;

performing an identification step comprising identifying additional sets of users-having permissions to read the sensitive information via the additional sets of information transfer paths;

performing an ascertaining step comprising ascertaining more additional sets of information transfer paths having information transfer paths other than the information transfer paths already determined via which at least one of the original sets of users can write the sensitive information or additional sets of users can write the sensitive information;

performing a finding step comprising finding more additional sets of users having permission to read the sensitive information via the more additional sets of information transfer paths; and repeating the ascertaining step and the finding step until no further additional information transfer paths are identified;

compare geographic locations of information transfer paths in the set comprising the final information transfer paths associated with the sensitive information to a list of prohibited geographic locations;

flag a specific information transfer path in the set comprising the final information transfer paths associated with the sensitive information that connects to a prohibited geographic location on the list of prohibited geographic locations;

display a map of the flagged specific information transfer path including one or more approved geographic locations leading to the prohibited geographic location;

compare geographic locations of users with read permission or write permission associated with the sensitive information along the specific information transfer path to the list of prohibited geographic locations;

flag a specific user from the users with read permission or write permission associated with the sensitive information along the specific information transfer path when the specific user is in a prohibited geographic location on the list of prohibited geographic locations; and change, responsive to a combination of the flagging of the specific information transfer path and the flagging of the specific user, an information access permission of the flagged specific user.

14. The non-transitory computer-readable medium of claim 13, further comprising one or more computer-executable instructions that, when executed by the at least one processor of the computing device, cause the computing device to prevent transfer of the sensitive information via the flagged specific information transfer path.

15. The non-transitory computer-readable medium of claim 13, further comprising one or more computer-executable instructions that, when executed by the at least one processor of the computing device, cause the computing device to change a read permission and a write permission of the flagged specific user.

16. The non-transitory computer-readable medium of claim 13, further comprising one or more computer-executable instructions that, when executed by the at least one processor of the computing device, cause the computing device to prevent access to the sensitive information by the flagged specific user.

17. The non-transitory computer-readable medium of claim 13, wherein the map of the flagged specific information transfer path further includes at least one warning message associated with the prohibited geographic location.

18. The non-transitory computer-readable medium of claim 17, wherein the map of the flagged specific information transfer path further includes server information associated with the one or more approved geographic locations and the prohibited geographic location.

19. The non-transitory computer-readable medium of claim 18, wherein the server information indicates whether each server in the flagged specific information transfer path is an originating server device, in an approved geographic location, or not in an approved geographic location.

20. The non-transitory computer-readable medium of claim 19, wherein the map of the flagged specific information transfer path is displayed on a user display device.

* * * * *